US012557833B2

(12) United States Patent
Johnson et al.

(10) Patent No.: US 12,557,833 B2
(45) Date of Patent: Feb. 24, 2026

(54) CAKING RESISTANT SALT COMPOSITIONS

(71) Applicant: Cargill, Incorporated, Wayzata, MN (US)

(72) Inventors: Janice Marie Johnson, Maple Grove, MN (US); Robert Scott Koefod, Maple Grove, MN (US); Julie R. Schuette, Buffalo, MN (US)

(73) Assignee: Cargill, Incorporated, Wayzata, MN (US)

( * ) Notice: Subject to any disclaimer, the term of this patent is extended or adjusted under 35 U.S.C. 154(b) by 967 days.

(21) Appl. No.: 17/431,368

(22) PCT Filed: Feb. 18, 2020

(86) PCT No.: PCT/US2020/018605
§ 371 (c)(1),
(2) Date: Aug. 16, 2021

(87) PCT Pub. No.: WO2020/172143
PCT Pub. Date: Aug. 27, 2020

(65) Prior Publication Data
US 2022/0132904 A1 May 5, 2022

Related U.S. Application Data

(60) Provisional application No. 62/807,062, filed on Feb. 18, 2019.

(51) Int. Cl.
| | |
|---|---|
| *A23P 10/43* | (2016.01) |
| *A23L 25/00* | (2016.01) |
| *A23L 27/40* | (2016.01) |
| *A23L 29/219* | (2016.01) |

(52) U.S. Cl.
CPC .............. *A23P 10/43* (2016.08); *A23L 25/30* (2016.08); *A23L 27/40* (2016.08); *A23L 29/219* (2016.08)

(58) Field of Classification Search
None
See application file for complete search history.

(56) References Cited

U.S. PATENT DOCUMENTS

| | | | | |
|---|---|---|---|---|
| 6,395,198 | B1 * | 5/2002 | McArdle | ................. C09K 3/22 252/384 |
| 2006/0134312 | A1 * | 6/2006 | Dekker | .................. A23L 19/01 426/660 |

| | | | |
|---|---|---|---|
| 2006/0286275 | A1 | 12/2006 | Salemme |
| 2007/0059428 | A1 | 3/2007 | Chigurupati |
| 2013/0216667 | A1 | 8/2013 | Rath |

FOREIGN PATENT DOCUMENTS

| | | | |
|---|---|---|---|
| CN | 108283305 | A | 7/2018 |
| CN | 109567114 | A | 4/2019 |
| GR | 1008875 | B | 10/2016 |
| JP | 58198269 | A | 11/1983 |
| JP | 2006223189 | A * | 8/2006 |
| WO | 0125365 | W | 4/2001 |
| WO | 2008005231 | A2 | 1/2008 |
| WO | 2008043054 | A2 | 4/2008 |
| WO | 2015015151 | A1 | 2/2015 |
| WO | 2017203358 | A1 | 11/2017 |

OTHER PUBLICATIONS

"Anticaking agents". Available online at https://www.foodadditivesworld.com/anticaking-agents.html on Aug. 2016. (Year: 2016).*
Kandekar et al., "Modified Starch as a Versatile Pharmaceutical Excipient: A Comprehensive Review". Int. J. Pharm. Sci. Rev. Res., 57(2), Article 1, pp. 1-8. (Year: 2019).*
There's Ferrocyanide in our Food. What should we do about it?
"Starch gelatinization" Wikipedia [online] Dec. 14, 2023, retrieved from the Internet: <URL: https://en.wikipedia.org/w/index.php?title=Starch_gelatinization&oldid=1189799902>, [retrieved on May 9, 2024] 3 pages.
Fu et al., "Generating waxy rice starch with target type of amylopectin fine structure and gelatinization temperature by waxy gene editing" Carbohydrate Polymers, 306:120595, 9 pages, published online Jan. 16, 2023.

* cited by examiner

*Primary Examiner* — Erik Kashnikow
*Assistant Examiner* — Assaf Zilbering

(57) ABSTRACT

Salt compositions with reduced caking tendency and improved clean label acceptability comprise a blend of dry ingredients comprising a salt selected from the group consisting of sodium chloride, potassium chloride, iodized sodium chloride, iodized potassium chloride and mixtures thereof; and a dry particulate flow agent selected from the group consisting of flour, corn bran, soy fiber, inulin, whey, casein, starch, sugar, protein, lecithin, citrus fiber and mixtures thereof. The salt compositions are especially useful for use in food preparation, manufacture, and seasoning.

20 Claims, No Drawings

CAKING RESISTANT SALT COMPOSITIONS

CROSS REFERENCE TO RELATED APPLICATIONS

This application is a national phase application of PCT/US2020/018605, filed 18 Feb. 2020, entitled CAKING RESISTANT SALT COMPOSITIONS, which claims the benefit of U.S. Provisional Application No. 62/807,062, filed 18 Feb. 2019, entitled CAKING RESISTANT SALT COMPOSITIONS, each of which are hereby incorporated by reference in their entirety.

BACKGROUND

Salt products (particularly sodium chloride (NaCl), but also including potassium chloride (KCl)) are prone to caking. When exposed to alternating humidity and temperature, salt can absorb and lose moisture. Moisture absorption causes a brine film to form between adjacent crystals. When conditions permit the moisture to evaporate, new salt crystals grow from the evaporating brine which act as bridges, fusing adjacent crystals together and causing the salt to cake. Salt caking is very problematic as it impedes flowability and can make the salt difficult to transport, handle, store, and apply. Therefore, salt products are commonly treated with additives to inhibit caking. The commonly used additives function by different mechanisms.

One of the most common anti-caking additives for NaCl is sodium or potassium ferrocyanide. Ferrocyanides are very effective anti-caking agents for NaCl, acting as crystal habit modifiers; at very low concentrations they cause NaCl to crystallize as fragile dendrites rather than cubic crystals. This greatly reduces caking tendency as the dendritic crystals cannot form strong crystal bridges. Another category of commonly used additives to reduce salt caking are flow agents such as silicas, tricalcium phosphate, and sodium aluminosilicates. These are typically inorganic, insoluble materials of a smaller particle size than the salt crystals. They are usually added at higher levels than the ferrocyanides to form a coating on the salt crystals that inhibits their fusing together. They may function by different mechanisms, including by acting as desiccants or by forming a physical barrier, making crystal bridging more difficult.

There has been some exploration of natural, organic materials as caking inhibitors. Nu-Flow™ is a commercial product made from ground rice hulls that is sold as a natural flow agent alternative to silica, TCP, and other synthetic flow agents. Pure powdered plant cellulose and fiber from wheat, bamboo, and oats are sold under the trade name Jelucel® as natural flow agents. OrganiFlow™ is a dried brown rice powder sold as a commercial flow agent. WO 2012/002599 describes "defatted rice bran extract dietary fiber" as an anti-caking agent for food additives.

U.S. Pat. No. 6,395,198 describes an anti-caking agent for salt comprising a complex including a substantially water insoluble protein, a water soluble saccharide, an alkali or alkaline earth metal salt, and an acid, though there is no disclosure of a simple blend of salt and protein or salt and saccharide absent the addition of acid. U.S. Patent Application 2010/0209573 describes a seasoning salt comprising salt particles, a seasoning additive, and a gelatinized tapioca starch solution as "a binder and anti-caking agent," though the tapioca starch solution is being used to bind the salt and seasoning particles together to make a granulated product. U.S. Pat. No. 5,094,862 describes free flowing salt substitute granules comprising a core of crystalline sugar and sweetness inhibitors coated with NaCl, comprising at least 25% sugar by weight, though this is another granulated formulation and the sugar is not functioning as a simple, dry blended anti-caking agent as such. U.S. Application 2018/0092394 describes a method for manufacturing free flowing granules comprising salt particles coated on to the surface of core particles of an edible material by blending them together above the glass transition temperature of the core edible material. In this case, again, the edible core material is not functioning as a simple, dry blended caking inhibitor, as such. U.S. Application 2016/0000125 discloses that "coating a food body with particles of skin, hull, seeds, or any combination thereof, of fruits, and/or vegetables provides a food body that has improved flowability, i.e. less cohesion to other food bodies." However, this disclosure is related to "food bodies" defined as a "fruit body or vegetable body," which is substantially different from salt as described herein.

SUMMARY

There is a growing desire from consumers for products with "clean labels," i.e. containing only natural, familiar, simple ingredients that are easily understood and recognized and not containing additives that are artificial, synthetic, or "chemical" sounding. While the commonly used anti-caking and flow agents for salt are very effective, they may be undesirable from a "clean label" standpoint. Thus, there is a need for alternatives to these "chemical" and "engineered" standard anti-caking and flow agents for salt that would be considered more label-friendly by consumers, cost effective, and compatible with food products (e.g. not causing any undesirable changes in food sensory characteristics, food manufacturing processes, cooking, etc). Ideally, a clean label anti-caking or flow agent would be a material that is already a well recognized, basic food material. Surprisingly, it has been discovered that by use of dry blends of basic food ingredients as described herein, it is possible to provide excellent caking resistant salt products. The present compositions are in contrast to conventional techniques that involve more complex, multi-component anti-caking admixtures containing other chemicals or unique granulation methods to make agglomerates of salt with food material substrates.

In an aspect, it has surprisingly been discovered that dry particulate materials that, when stored as a homogeneous dry product by itself under humid conditions will tend to "clump" or "cake," may be used as an effective dry particulate flow agents to inhibit clumping of salt compositions.

In an aspect, a salt composition is provided having reduced caking tendency and improved clean label acceptability that comprises a blend of dry ingredients comprising a salt selected from the group consisting of sodium chloride, potassium chloride and mixtures thereof; and a dry particulate flow agent selected from the group consisting of flour, corn bran, soy fiber, inulin, whey, casein, starch, sugar, protein, lecithin, citrus fiber and mixtures thereof.

Advantageously, the present salt compositions may be prepared by incorporating materials made from commonly used, basic food materials selected from the group consisting of flour, corn bran, soy fiber, inulin, whey, casein, starch, sugar, protein, lecithin, citrus fiber and mixtures thereof, that function as effective caking inhibitors when simply dry blended with salt. The present compositions may be used as clean label alternatives to standard "chemical" free flow agents such as tricalcium phosphate, silicas, and sodium aluminosilicates in salt.

DETAILED DESCRIPTION

It has surprisingly been discovered that dry particulate flow agents selected from the group consisting of flour, corn bran, soy fiber, inulin, whey, casein, starch, sugar, protein, lecithin, citrus fiber and mixtures thereof can be simply dry-blended with salt to yield compositions with similar caking resistance to blends of salt with standard flow agents such as tricalcium phosphate, silica, or sodium aluminosilicate. In an aspect, the dry particulate flow agents are selected from the group consisting of flour, corn bran, soy fiber, inulin, whey, casein, starch, sugar, protein, lecithin, citrus fiber and mixtures thereof.

In an aspect, the sodium chloride and/or potassium chloride salt can sourced from solar salt, sea salt, rock salt, or mixtures thereof. In an aspect, the salt can include trace amounts of other compounds, such as the trace minerals naturally present in sea salt or the trace amounts of iodine present in many edible salts such as iodized salt where the iodine is present in the form of sodium iodide, potassium iodide, or potassium iodate. The salt can also include other fortifying nutrients and agents such as iodide, fluoride, vitamins, medicinal additives, mineral supplements, etc. The salt composition may be made from salt with a variety of physical forms and particle size ranges.

In an aspect, the composition does not contain tricalcium phosphate, ferrocyanide, silica, or sodium aluminosilicate anti-caking or flow agents. In an aspect, the composition contains no more than 5% by weight of any inorganic ingredient other than sodium chloride and potassium chloride. In an aspect, the composition contains no more than 3% by weight of any inorganic ingredient other than sodium chloride and potassium chloride. In an aspect, the composition contains no more than 1% by weight of any inorganic ingredient other than sodium chloride and potassium chloride. In an aspect, the composition contains 85% or more by weight of ingredients selected from sodium chloride, potassium chloride, and mixtures thereof. In an aspect, the composition contains 90% or more by weight of ingredients selected from sodium chloride, potassium chloride, and mixtures thereof. In an aspect, the composition contains 95% or more by weight of ingredients selected from sodium chloride, potassium chloride, and mixtures thereof. In an aspect, the composition contains 97% or more by weight of ingredients selected from sodium chloride, potassium chloride, and mixtures thereof. In an aspect, the composition contains 98% or more by weight of ingredients selected from sodium chloride, potassium chloride, and mixtures thereof. In an aspect, the composition contains 99% or more by weight of ingredients selected from sodium chloride, potassium chloride, and mixtures thereof.

In an aspect, the composition is substantially free of any ingredient other than a salt selected from the group consisting of sodium chloride, potassium chloride, iodized sodium chloride, iodized potassium chloride and mixtures thereof; and a dry particulate flow agent selected from the group consisting of flour, bran, starch, sugar, protein, lecithin, and mixtures thereof.

In an aspect, the salt is selected from the group consisting of granular salt, flake salt, micro-sized salt, solar salt, sea salt, rock salt, and combinations thereof.

In an aspect, the salt can be a standard evaporated, granulated sodium chloride with a particle size range between about 100 and 700 micron. In another aspect, the salt can be a "flake salt" made by compacting the salt under pressure followed by comminution, for example, by means of a roller mill, disk mill, pin mill, jaw crusher, hammer mill, jet mill, ball mill, and other similar machines to a particle size range between about 900 and 50 micron. In yet another aspect, the salt can be a micro-sized salt prepared by pulverizing or grinding larger sized salt particles to a size range smaller than 50 micron. In another aspect, the salt can be completely or partially amorphous.

Another aspect of the present invention includes using these formulations as low sodium or reduced sodium salt alternatives. Sodium chloride with a sufficiently small particle size is known to dissolve faster in the mouth and thereby create a stronger salty flavor intensity than larger sized crystals at the same total salt dose. However, caking tendency generally increases as salt particle size decreases. Thus, in one aspect products of a small salt crystal size and/or amorphous salt particles may be formulated with the food material flow agents described herein to provide more caking resistant salt products that may be used to reduce the sodium content in food while maintaining a satisfactory degree of saltiness.

As noted above, in an aspect the flow agent is a dry particulate flow agent selected from the group consisting of flour, corn bran, soy fiber, inulin, whey, casein, starch, sugar, protein, lecithin, citrus fiber and mixtures thereof.

In an aspect, the flow agent comprises flour derived from a material selected from the group consisting of grains, seeds, nuts, vegetables, roots, tubers, beans, fruits, legumes, and combinations thereof. In an aspect, the flow agent comprises flour derived from a material selected from the group consisting of coconut flour, potato flour, wheat flour, barley flour, gluten flour, semolina flour, almond flour, amaranth flour, corn flour, flaxseed flour, oat flour, peanut flour, white rice flour, rye flour, soy flour, spelt flour, cassava flour, chickpea flour, dal flour, kamut flour, millet flour, teff flour, acorn flour, banana flour, fava bean flour, buckwheat flour, chestnut flour, hemp flour, plantain flour, mesquite flour, hazelnut flour, sorghum flour, tapioca flour, carrot flour, and combinations thereof. In an aspect, the flow agent comprises flour derived from pea flour.

In an aspect, the flow agent comprises corn bran.

In an aspect, the flow agent comprises starch derived from grains, seeds, nuts, vegetables, roots, tubers, beans, fruits, legumes, flowering plants, plant stems, and combinations thereof. In an aspect, the flow agent comprises starch selected from the group consisting of potato starch, wheat starch, corn starch, cassava starch, tapioca starch, rice starch, acorn starch, arrowroot starch, arracacha starch, banana starch, barley starch, breadfruit starch, buckwheat starch, canna starch, colacasia starch, katakuri starch, kudzu starch, malanga starch, millet starch, oat starch, oca starch, sago starch, sorghum starch, sweet potato starch, rye starch, taro starch, chestnut starch, water chestnut starch, pea starch, yam starch, bean starch and combinations thereof. In an aspect, the flow agent comprises starch is derived from beans selected from fava beans, lentils, mung beans, and chickpeas. In an aspect, the starch is a pre-gelatinized starch. In an aspect, the flow agent comprises starch selected from the group consisting of modified starch, dextrin, cross linked starch, acid-treated starch, alkaline-treated starch, bleached starch, oxidized starch, enzyme-treated starch, monostarch phosphate, distarch phosphate, phosphated distarch phosphate, acetylated distarch phosphate, starch acetate, acetylated distarch adipate, hydroxypropyl starch, hydroxypropyl distarch phosphate, hydroxypropyl distarch glycerol, starch sodium octenyl succinate, and acetylated oxidized starch. In an aspect, the flow agent comprises starch selected from the group consisting of corn, unmodified waxy corn, tapioca, and potato. In an aspect, the flow agent comprises tapioca starch.

In an aspect, the flow agent comprises corn starch selected from the group consisting of Cargill Battercrisp 90240 starch and Cargill Battercrisp 05537 starch. In an aspect, the flow agent comprises tapioca starch that is Cargill Creamtex 75711 starch.

In an aspect, the flow agent comprises starch that is a pre-gelatinized starch. In an aspect, the flow agent comprises starch that is a modified starch.

In an aspect, the flow agent comprises sugar selected from the group consisting of glucose, fructose, galactose, mannose, ribose, deoxyribose, sucrose, lactulose, lactose, maltose, trehalose, cellobiose, chitobiose, other disaccharaides, and combinations thereof. In an aspect, the flow agent comprises sugar that is sucrose.

In an aspect, the flow agent is selected from whey, casein, and combinations thereof.

In an aspect, the flow agent comprises protein selected from the group consisting of protein concentrates, protein isolates, and protein hydrolysates derived from egg, dairy, seed, legumes, grain, nuts, fruit, animal, fish, meat, poultry, bacteria, algae, flowering plant, germ, vegetable sources, and combinations thereof. In an aspect, the protein is derived from milk. In an aspect, the protein is a milk protein concentrate ("MPC"). In an aspect, the protein is casein. In an aspect, the protein is derived from the group consisting of whey, egg, pea, hemp, brown rice, rice, cranberry, alfalfa, chia seeds, flax seeds, artichoke, quinoa, soy, spinach, corn, chlorella, buckwheat, millet, oats, rye, wheat, wheat germ, wild rice, apple, banana, cantaloupe, grape, grapefruit, honeydew melon, orange, papaya, peach, pear, pineapple, strawberry, tangerine, watermelon, almonds, cashews, filberts, hemp seeds, chickpeas, kidney beans, lentils, lima beans, pumpkin seeds, sesame seeds, sunflower seeds, walnuts, navy beans, peanuts, spirulina, chicken, beef, pork, and combinations thereof. In an aspect, the flow agent comprises protein selected from soy protein concentrate, soy protein isolate, and pea protein In an aspect, the flow agent comprises lecithin selected from the group consisting of a hydrolyzed, non-hydrolyzed, dry, liquid, de-oiled, or fractionated lecithin. In an aspect, the lecithin is derived from a material selected from the group consisting of seeds, seed oil, eggs, dairy, vegetables, fruits, meat, poultry, fish, fungi, algae, and combinations thereof. In an aspect, the flow agent comprises lecithin that is derived from a material selected from the group consisting of soy, eggs, milk, rapeseed, cottonseed, sunflower seed, corn, canola seed, peanut, palm kernel, wheat, barley, rice, olive, mango, avocado, and combinations thereof. In an aspect, the flow agent comprises lecithin selected from the group consisting of a hydrolyzed, non-hydrolyzed, dry, liquid, de-oiled, or fractionated lecithin. In an aspect, the flow agent comprises lecithin derived from a material selected from the group consisting of soy and sunflower seed.

In an aspect, the flow agent comprises citrus fiber selected from fiber from the group consisting of lemon, lime and orange. In an aspect, the flow agent comprises Cargill CitriTex Amp 100 citrus fiber.

In an aspect, the mean particle size of the flow agent is less than that of the mean particle size of the salt. In an aspect, the mean particle size of the flow agent is between 10 micron and 1000 micron. In an aspect, the mean particle size of the flow agent is between 100 micron and 500 micron. In an aspect, the mean particle size of the flow agent is between 30 micron and 200 micron.

In an aspect, the composition comprises from 0.1% to 50.0% flow agent and from 99.9% to 50.0% salt. In an aspect, the composition comprises from 0.1% to 25.0% flow agent and from 99.9% to 75.0% salt. In an aspect, the composition comprises from 0.1% to 10.0% flow agent and from 99.9% to 90.0% salt.

In an aspect, the flow agent is present in an amount of at least 0.1% by weight of the total weight of the total composition. In an aspect, the flow agent is present in an amount of at least 0.5% by weight of the total weight of the total composition.

In an aspect, a salt composition with reduced caking tendency and improved clean label acceptability comprising a blend of dry ingredients is provided comprising a salt selected from the group consisting of sodium chloride, potassium chloride, iodized sodium chloride, iodized potassium chloride and mixtures thereof; and a flow agent selected from edible oils, wherein the edible oils is present in an amount sufficient to exhibit a flowability of at least 30 g/s. In an aspect, the edible oil is derived from coconut, palm, palm kernel, olive, peanut, canola, soybean, cottonseed, cashew, sunflower, nuts, corn, linseed, safflower, avocado, mustard, rice bran, almond, apricot kernel, basil, brazil nut, butter, cocoa butter, grapeseed, hazelnut, hemp, lard, macadamia nut, sesame, tallow, and walnut.

The salt composition can be prepared by any appropriate mixing method to mix the salt and flow agent, such as by placing the salt and flow agent into a mixing device. The salt and flow agent can be placed into the mixing device by means commonly known in the industry, such as by hand or by a conveyor. The mixing device can be, for example, a ribbon blender, paddle blender, plow blender, twin shell blender, double-cone blender, V-blender, single or double rotor blender, muller blender, vertical screw mixer, or similar mixing systems. The salt and ingredient can be placed into the mixing device for a sufficient amount of time to thoroughly mix the salt and ingredient. The mixing can be done either by batch mixing or a continuous process. In one batch aspect the salt and ingredient are mixed in the mixing device for about two to twenty minutes. In another aspect the salt and ingredient are mixed in the mixing device for about four to eight minutes.

In an aspect, the salt composition is formulated to use in specific food applications over a broad range of food product types. By custom formulation and matching to food application end uses, one can provide a clean label salt product that performs in a highly effective manner in the final use food product.

In an aspect, the salt composition contains a flow agent made from a food material that would be conventionally used in food recipes of the end use food product in which the salt composition will be used. In this aspect, the salt flow agent is thus automatically compatible with a given end use food product even though the food material source of the flow agent is not necessarily identical to an ingredient of the end use food product. This is advantageous because the salt composition is therefore assured to be compatible in mixing with the other ingredients of the final food product. Moreover, this selection of the flow agent with the food recipes of the end use food product in mind is particularly advantageous because the label of the end use food product not only is "clean" in that the flow agent does not cause listing of a "non-natural" or "chemical" component on the label, but in addition in the label of the end use food product does not include an ingredient that is "out of place" in the listing of materials in the end use food product. In addition, because the flow agent is made from a food material that would be conventionally used in food recipes of the end use food product in which the salt composition will be used, the food producer is assured that the intended flavor of the final food product will not be adversely affected by the flow agent.

In an aspect, the salt composition contains a flow agent made from a food material that is an ingredient of the end use food product in which the salt composition will be used. This is advantageous because the salt composition is therefore assured to be compatible in mixing and in flavor with the other ingredients of the final food product. Moreover, because the salt composition does not introduce an ingredient that is different from the balance of the components of the final food product, there is no need to modify the existing food product label to disclose a new component flow agent.

In addition to effectively reducing caking, for food use applications a clean label free flow agent for salt must also be compatible with the given food product the salt is added to, i.e. the additive must not impart any undesirable sensory characteristics to the food product (tastes, odors, colors, mouth feel, etc.) or otherwise interfere with the food processing and production. The types of food material flow agents described above are generally expected to be compatible with food products precisely because they are themselves edible food materials. Of course, a food material flow agent selected from one of the native components of the food product itself would obviously be compatible with the food product, but there may be many instances in which a serviceable flow agent of this type may differ from the other components of the food product and not all choices from the broad categories of flours, brans, starches, sugars, proteins, and lecithin will necessarily be compatible with every food product application. However, the very breadth of options that can be selected from this range of food material flow agents facilitates the identification of effective flow agents that will be compatible with given food products. Nevertheless, additives that would be generally compatible with a range of different food product applications would be especially desirable. In order to determine the likely compatibility of salt flow agents of these types in food products where they are not identical to one of the pre-existing ingredients of the food product, sensory tests were carried out on salt blends with some selected additives.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by $\frac{1}{10}$ of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A salt composition with reduced caking tendency comprising a blend of dry ingredients comprising
   at least 85% by weight of a salt selected from the group consisting of sodium chloride, potassium chloride, iodized sodium chloride, iodized potassium chloride and mixtures thereof; and
   a dry particulate flow agent comprising a pre-gelatinized starch.

2. The composition of claim 1, wherein the flow agent further comprises flour derived from a material selected from the group consisting of coconut flour, potato flour, wheat flour, barley flour, gluten flour, semolina flour, almond flour, amaranth flour, corn flour, flaxseed flour, oat flour, peanut flour, white rice flour, rye flour, soy flour, spelt flour, cassava flour, chickpea flour, dal flour, kamut flour, millet flour, teff flour, acorn flour, banana flour, fava bean flour, buckwheat flour, chestnut flour, hemp flour, plantain flour, mesquite flour, hazelnut flour, sorghum flour, tapioca flour, carrot flour, and combinations thereof.

3. The composition of claim 1, wherein the flow agent further comprises starch selected from the group consisting of potato starch, wheat starch, corn starch, cassava starch, tapioca starch, rice starch, acorn starch, arrowroot starch, arracacha starch, banana starch, barley starch, breadfruit starch, buckwheat starch, canna starch, colacasia starch, katakuri starch, kudzu starch, malanga starch, millet starch, oat starch, oca starch, sago starch, sorghum starch, sweet potato starch, rye starch, taro starch, chestnut starch, water chestnut starch, pea starch, yam starch, bean starch, and combinations thereof.

4. The composition of claim 1, wherein the flow agent further comprises a modified starch.

5. The composition of claim 1, wherein the flow agent further comprises sugar selected from the group consisting of glucose, fructose, galactose, mannose, ribose, deoxyribose, sucrose, lactulose, lactose, maltose, trehalose, cellobiose, chitobiose, other disaccharides disaccharides, and combinations thereof.

6. The composition of claim 1, wherein the flow agent further comprises a milk protein concentrate.

7. The composition of claim 1, wherein the flow agent further comprises casein.

8. The composition of claim 1, wherein the flow agent further comprises a protein selected from soy protein concentrate, soy protein isolate, and pea protein.

9. The composition of claim 1, wherein the flow agent further comprises lecithin.

10. The composition of claim 1, wherein the flow agent further comprises lecithin derived from soy or sunflower seed.

11. The composition of claim 1, wherein the flow agent further comprises citrus fiber selected from fiber from the group consisting of lemon, lime and orange.

12. The composition of claim 1, wherein the sodium chloride is selected from the group consisting of granular salt, flake salt, micro-sized salt, solar salt, sea salt, rock salt, and combinations thereof.

13. The composition of claim 1, wherein the mean particle size of the flow agent is less than that of the mean particle size of the salt.

14. The composition of claim 1, wherein the mean particle size of the flow agent is between 10 micron and 1000 micron.

15. The composition of claim 1, wherein the composition comprises from 0.1% to 10.0% flow agent and from 99.9% to 90.0% salt.

16. The composition of claim 1, wherein the flow agent is present in an amount of at least 0.1% by weight of the total weight of the total composition.

17. The composition of claim 1, wherein the composition does not contain tricalcium phosphate, ferrocyanide, silica, or sodium aluminosilicate.

18. The composition of claim 1, wherein the composition contains no more than 5% by weight of any inorganic ingredient other than sodium chloride and potassium chloride.

19. The composition of claim 1, wherein the composition contains a) 97% or more by weight of ingredients selected from sodium chloride, potassium chloride, and mixtures thereof, and b) no more than 3% by weight of any inorganic ingredient other than sodium chloride and potassium chloride.

20. A salt composition with reduced caking tendency comprising a blend of dry ingredients comprising at least 97% by weight of a salt selected from the group consisting of sodium chloride, potassium chloride and mixtures thereof; and at least 0.1% by weight of a dry particulate flow agent comprising a pre-gelatinized starch.

\* \* \* \* \*